United States Patent
Yang et al.

(10) Patent No.: US 8,385,364 B2
(45) Date of Patent: Feb. 26, 2013

(54) DISTRIBUTED MESSAGE-PASSING BASED RESOURCE ALLOCATION IN WIRELESS SYSTEMS

(75) Inventors: Kai Yang, Princeton, NJ (US); Xiaodong Wang, New York, NY (US); Narayan Prasad, Monmouth Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 817 days.

(21) Appl. No.: 12/549,546

(22) Filed: Aug. 28, 2009

(65) Prior Publication Data

US 2010/0091729 A1 Apr. 15, 2010

Related U.S. Application Data

(60) Provisional application No. 61/099,607, filed on Sep. 24, 2008.

(51) Int. Cl.
*H04J 3/16* (2006.01)

(52) U.S. Cl. ........ 370/468; 370/329; 370/343; 370/344; 370/464

(58) Field of Classification Search ................ None
See application file for complete search history.

(56) References Cited

U.S. PATENT DOCUMENTS

2007/0223440 A1* 9/2007 Ho et al. .................. 370/342
2007/0297323 A1* 12/2007 Seki ........................ 370/208

FOREIGN PATENT DOCUMENTS

WO  WO 2007036003 A1 *  4/2007

OTHER PUBLICATIONS

Y. Cheng, M. Neely, and K. M. Chugg, Maximum weight matching via max-product belief propagation, Proc. IEEE Intel. Conf. Info. Theory (ISIT 2006), 2006.*
H. G. Myung, J. Lim, and D. J. Goodman, On the comparison between OFDM and single carrier modulation with a DFE using a frequency domain feedforward filter, *IEEE Trans. on Commun.*, vol. 50, pp. 947-955, Jan. 2002.
C. Wong, R. Cheng, K. Letaief, and R. Murch, Multiuser OFDM with adaptive sub-carrier, bit, and power allocation, *IEEE J. Select. Areas Commun.*, vol. 17, pp. 1747 { 1758, Oct. 1999.
Y. Cheng, M. Neely, and K. M. Chugg, Maximum weight matching via max-product belief propagation,*Proc. IEEE Intel. Conf. Info. Theory (ISIT 2006)*, 2006.
M.Bayati, D. Shah, and M. Sharma, Iterative message passing algorithm for bipartite maximum weighted matching, *Proc. IEEE Intel. Conf. Info. Theory (ISIT 2006)*, 2005.

* cited by examiner

*Primary Examiner* — Jason Mattis
*Assistant Examiner* — James P Duffy
(74) *Attorney, Agent, or Firm* — Joseph Kolodka; Bao Tran

(57) ABSTRACT

Systems and methods are disclosed to allocate resources in discrete Fourier transform spread orthogonal frequency division multiple access (DFT-S-OFDMA) networks, which involve determining a reward for each user when assigned a frequency chunk (FC) of subcarriers, where each FC is a set of contiguous subcarriers; splitting each user into one or more sub-users, with each sub-user having identical rewards; and assigning resources with a message-passing based FC allocation.

20 Claims, 10 Drawing Sheets

Algorithm 1 [The message-passing max-product algorithm for solving (5)]

1. *Initialization:* $\forall \ \{(i,j) : H_{ij} = 1\}$, let $\overleftarrow{w}_{ij}^{(-1)}(v_j) = 1, v_j \in \{0,1\}$.

2. *Repeat* $k \leftarrow k + 1$ (a) *For each variable node $V_j$, update its message to the factor node $f_i \in \sigma(V_j)$:*
   $$\overrightarrow{w}_{ji}^{(k)}(v_j) = g_j(v_j) \prod_{\{\ell : H_{\ell j}=1, \ \ell \neq i\}} \overleftarrow{w}_{\ell j}^{(k-1)}(v_j), \ v_j \in \{0,1\}.$$

(b) *For each factor node $f_i$, update its messages to the variable node $V_j \in \nu(f_i)$:*
   $$\overleftarrow{w}_{ij}^{(k)}(v_j) = \max_{\{u : u_\ell \in \{0,1\}, \forall \ell; \ u_j = v_j\}} \left[ f_i(\boldsymbol{h}_i, \boldsymbol{u}) \prod_{\{H_{i\ell}=1, \ \ell \neq j\}} \overrightarrow{w}_{\ell i}^{(k)}(u_\ell) \right], \ v_j \in \{0,1\}.$$

(c) *Calculate the total message for the variable node $V_j$:*
   $$W_j^{(k)}(v_j) = g_j(v_j) \prod_{\{i : H_{ij}=1\}} \overleftarrow{w}_{ij}^{(k)}(v_j), \ v_j \in \{0,1\}.$$

3. *Until convergence or the number of iterations exceeds a pre-specified threshold.*

4. $v_j = \delta\left(W_j^{(k)}(1) > W_j^{(k)}(0)\right), j = 1, \ldots, N.$

FIG. 3

Algorithm 2 [Message-passing FC allocation algorithm for single-cell DFT-S-OFDMA]

1. *Initialization:* $\forall \{(i,j) : H_{ij} = 1\}$, let $\overleftarrow{m}_{ij}^{(-1)} = 0$. Let $\mathcal{S} = \{\}$, where $\mathcal{S}$ denotes the set containing the best current solution.

2. *Repeat* $k \to k+1$ (a) For each variable node $V_j$, update its message to the factor node $f_i \in \sigma(V_j)$:
    $\overrightarrow{m}_{ji}^{(k)} = c_j + \sum_{\{\ell \neq i,\ H_{\ell j}=1\}} \overleftarrow{m}_{\ell j}^{(k-1)}$.

(b) For each factor node $f_i$, update its messages to the variable node $V_j \in \nu(f_i)$:
    $\overleftarrow{m}_{ij}^{(k)} = -\max\{0, \max_{\{\ell \neq j,\ H_{i\ell}=1\}} \overrightarrow{m}_{\ell i}^{(k)}\}$.

(c) Calculate the total message for the variable node $V_j$ at the $k^{th}$ iteration:
    $M_j^{(k)} = c_j + \sum_{\{i:\ H_{ij}=1\}} \overleftarrow{m}_{ij}^{(k)}$.

3. Generate a feasible FC allocation solution $\{\bar{\alpha}_1^{(k)}, \bar{\alpha}_2^{(k)}, ..., \bar{\alpha}_P^{(k)}\}$ from $M_1^{(k)}, M_2^{(k)}, ..., M_P^{(k)}$ via Algorithm 3.

4. If the objective function value of $[\bar{\alpha}_1^{(k)}, \bar{\alpha}_2^{(k)}, ..., \bar{\alpha}_P^{(k)}]$ is larger than that of the best current solution stored in $\mathcal{S}$, replace the best current solution by $[\bar{\alpha}_1^{(k)}, \bar{\alpha}_2^{(k)}, ..., \bar{\alpha}_P^{(k)}]$.

5. Until the best current solution does not change for a given number of iterations or the total number of iterations exceeds a pre-specified threshold.

6. Output the solution in $\mathcal{S}$.

FIG. 4

Algorithm 3 [Generating a feasible solution from the tentative decisions obtained by the message-passing algorithm]

1. Let $M_j$ denote the message obtained by the message-passing algorithm for the variable node $V_j$. Let $\mathcal{N}(V_j)$ and $\mathcal{N}(f_i)$ denote the neighboring factor nodes of $V_j$ and the neighboring variable nodes of $f_i$, respectively. Recall $P$ is the total number of variable nodes.

2. Rank $\{M_j\}$ in descending order to obtain $\{M_{\bar{j}(t)}\}$ such that $M_{\bar{j}(1)} \geq M_{\bar{j}(2)} \geq M_{\bar{j}(3)} ... \geq M_{\bar{j}(P)}$. Let $\alpha_{\bar{j}(t)} = 1$, $\forall t$, and $\ell = 1$.

3. While $\ell < P + 1$

- *If* $\alpha_{\bar{j}(\ell)} = 1$
        - Let $\alpha_p = 0$, $\forall V_p \in \mathcal{N}(f_q)$, $f_q \in \mathcal{N}(V_{\bar{j}(\ell)})$,
    - *End(If)*
    - $\ell \rightarrow \ell + 1$.

*End(while)*

FIG. 5

Algorithm 4 [Generating perturbed coefficients]

1. Rank $\{\tilde{c}_j\}$ in ascending order. Let $\{\mu_1, \mu_2, ..., \mu_L\}$ denote all $L$ distinct coefficients in $\{\tilde{c}_j\}$. Further, let $\mu_{L+1} = 2\mu_L - \mu_{L-1}$, and $\Delta\mu \triangleq \max_{1 \leq i \leq L}(\mu_{i+1} - \mu_i)$.

2. For every $\tilde{c}_j = \mu_\ell$, generate $\Delta\tilde{c}_j \triangleq (\mu_{\ell+1} - \mu_\ell)\epsilon_j$, where $\epsilon_j$ is a $U(0, \theta)$ random variable with $\theta < 1$.

FIG. 6

Algorithm 5 : $\nu$-max-sum algorithm for FC allocation in a DFT-S-OFDMA system

1. *Initialization:* Set the initial messages, i.e., $\forall \{(i,j) : \tilde{H}_{ij} = 1\}$, let $\overleftarrow{m}_{ij}^{(-1)} = 0$. Use Algorithm 4 to generate a collection of new coefficients, i.e., $d_j = \tilde{c}_j + \Delta\tilde{c}_j$.

2. Repeat

(a) $k \to k+1$.

(b) For each variable node $V_j$, update its message to the factor node $f_i \in N(V_j)$ as follows: $\overrightarrow{m}_{ji}^{(k)} = d_j + \sum_{\{\ell \neq i,\ H_{\ell j}=1\}} \overleftarrow{m}_{\ell j}^{(k-1)}$.

(c) For the $i^{th}$ factor node, update its messages to the $j^{th}$ variable node as: $\overleftarrow{m}_{ij}^{(k)} = -\max\{0, \max_{\{\ell \neq j,\ H_{i\ell}=1\}} \overrightarrow{m}_{\ell i}^{(k)}\}$.

(d) Calculate the total weight for the variable node $V_j$ at the $k^{th}$ iteration, i.e., $\bar{M}_j^{(k)} = d_j + \sum_{\{i:\ \tilde{H}_{ij}=1\}} \overleftarrow{m}_{ij}^{(k)}$.

3. Until convergence or the number of iterations exceeds a pre-specified threshold.

4. $\alpha_j = \delta\left(M_j^{(k)} > 0\right), \forall j$.

FIG. 7

Algorithm 6: [Message-passing algorithm with greedy method for muti-cell BC allocation]

1. *Initialization:* For each cell $j$, divide its users into interior users and edge users; generate virtual users for each edge user; obtain the set $A_j$; and set the reward of assigning virtual users to any BC as zero.

2. Run the Algorithm 5 to determine BC allocation for every cell.

3. For each BC $i$:

4. All BSs broadcast a message saying whether they have scheduled a user on BC $i$.

5. All BSs which have scheduled a user on BC $i$ together form a set $S$.

6. Repeat

7. Each BS $j \in S$ broadcasts a ratio $\frac{a_{ij}}{D_j+1}$, where $a_{ij}$ is the weighted rate of the user scheduled by BS $j$ on BC $i$ and $D_j$ is the number of BSs in $S$ which conflict with BS $j$.

8. The BS with the maximum ratio, say BS $j^*$, is allowed to schedule its user on BC $i$. BS $j^*$ and all BSs in $S$ which conflict with BS $j^*$ broadcast a message indicating that they have removed themselves from $S$.

9. Until $S$ is empty.

10. End For

FIG. 8

Algorithm 7 : [Dual message-passing for multi-cell FC allocation]

1. *Initialization: same as in Algorithm 6.*

2. Repeat *the following until the subgradient is zero or the number of iterations exceeds a pre-determined threshold.*

(a) *Run Algorithm 5 to perform FC allocation for each single-cell.*

(b) *Every base station sends the FC allocation results of its edge users to the adjacent cells containing the corresponding virtual users.*

(c) *Each base station calculates the sub-gradient via (25) and updates the rewards (dual variables) of assigning every FC to each its virtual users using (26).*

(d) *Every base station collects the dual variables corresponding to the virtual users spawned by its edge users.*

(e) *Every base station updates the rewards of assigning every FC to each of its edge users.*

FIG. 9

[Greedy Method for RB Allocation in LTE]

1. Initialization: Set $S$ to be the set of all variables $\{a_{k,i}^n\}$, $\forall k,n,i$. Set $\mathcal{G} = \phi$.

2. Repeat

3. Determine $a_{\hat{k},\hat{i}}^{\hat{n}} = \arg\max_{a_{k,i}^n \in S} M(a_{k,i}^n, S)$.

4. Update $\mathcal{G} \leftarrow \mathcal{G} \cup \{a_{\hat{k},\hat{i}}^{\hat{n}}\}$ 5. For all $a_{k,i}^n \in S$ 6. If $\mathcal{X}(a_{k,i}^n, a_{\hat{k},\hat{i}}^{\hat{n}}) = 1$, then update $S \leftarrow S - \{a_{k,i}^n\}$.

7. End For

8. Until $S$ is empty.

9. Set all $a_{\hat{k},\hat{i}}^{\hat{n}} = 1$, $\forall a_{\hat{k},\hat{i}}^{\hat{n}} \in \mathcal{G}$

FIG. 10

DISTRIBUTED MESSAGE-PASSING BASED RESOURCE ALLOCATION IN WIRELESS SYSTEMS

This application claims priority to Provisional Application Ser. No. 61/099,607, filed on Sep. 24, 2008, the content of which is incorporated by reference.

BACKGROUND

The application relates to resource allocation in a wireless system.

Discrete Fourier transform spread orthogonal frequency division multiple access (DFT-S-OFDMA) has emerged as the preferred uplink air interface for the next generation cellular systems such as the 3GPP LTE. DFT-S-OFDMA is essentially a modified form of OFDMA where users transmit their data on multiple subcarriers (frequencies) such that any two users are allocated non-overlapping sets of subcarriers. The key difference from OFDMA is that each user spreads its (coded) modulated information symbols using a DFT matrix and the spread (precoded) symbols are then mapped to its allocated subcarriers. The main advantage of this spreading operation is that with a proper mapping, it can result in considerably lower peak-to-average-power ratio (PAPR) compared to the classical OFDMA technique. The ideal sub carrier mapping in DFT-S-OFDMA for each user, which in fact results in the same PAPR as a single carrier signal, is an interleaved mapping where the subcarriers occupied by the user are equidistant from each other and span the whole system bandwidth. Unfortunately such a mapping precludes an important advantage of an OFDMA system which is frequency dependent scheduling gain. Thus, to balance the conflicting requirements of low PAPR and high scheduling gain, the DFT-S-OFDMA scheme employs localized mapping, where each user is assigned a set of (localized) contiguous subcarriers, henceforth referred to as a frequency chunk, on which it sees favorable channel conditions.

SUMMARY

Systems and methods are disclosed to allocate resources in discrete Fourier transform spread orthogonal frequency division multiple access (DFT-S-OFDMA) networks, which involve determining a reward for each user when assigned a frequency chunk (FC) of subcarriers, where each FC is a set of contiguous subcarriers; splitting each user into one or more sub-users, with each sub-user having identical rewards; and assigning resources with a message-passing based FC allocation.

Advantages of the system may include one or more of the following. The system enhances communication over DFT-S-OFDMA networks where each user can be assigned multiple chunks subject to it's transmit power constraint. Moreover, the symbols transmitted on different chunks need not be jointly precoded. Assigning multiple chunks to a user allows higher user data rate but also increases its PAPR. While PAPR is a limiting factor for cell edge users, it is not so for cell interior users, who can tolerate a larger power backoff. Thus, the system allows for a judicious tradeoff between PAPR reduction and improved throughput via higher scheduling gain.

BRIEF DESCRIPTION OF THE DRAWINGS

FIGS. 3-10 show exemplary methods for performing resource allocation.

DESCRIPTION

Figure 1:
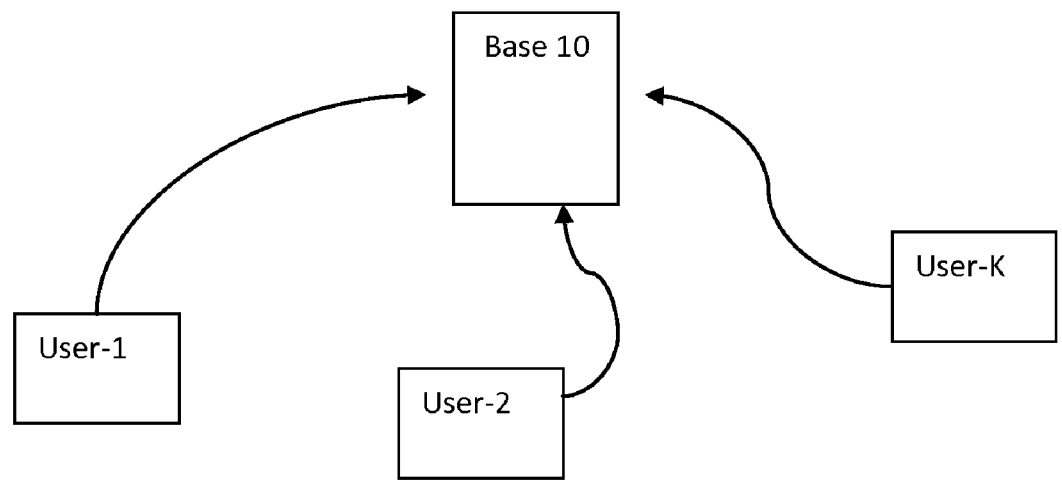
FIG. 1 shows an exemplary uplink where K users communicate with a Base-station (BS) using the DFT-S-OFDMA access technique.

FIG. 1 shows an exemplary uplink where K users communicate with a Base-station (BS) using the DFT-S-OFDMA access technique. The BS is equipped with one or more receive antennas and communicates with K mobiles each having a single transmit antenna with N being the total number of subcarriers or resource blocks (RBs) that are available for data transmission. Each user can be assigned one or more frequency chunks (FCs), where each chunk is a set of contiguous subcarriers. In one formulation, the $k^{th}$ user can be assigned up-to $n_k$ chunks, each of size $N_k$ subcarriers. In another formulation the size of each chunk assigned to a user must belong to a specified set. The BS has to assign chunks to different users under the constraint that no two assigned chunks overlap (or intersect) with each other. Moreover, the BS also has to assign a coding rate and one or more modulations to each user. The chunk assignment together with the assignment of coding rates and modulations to all users is referred to as resource allocation. The system provides such resource allocation algorithms that can be used by the BS.

The system applies resource allocation processes to the DFT-Spread-OFDMA uplink. In such an uplink, a collection of subcarriers are grouped into one chunk, and the frequency allocation is performed on a chunk by chunk basis. An ideal resource allocation method should allocate chunks to different users according to their channel gains such that the total weighted sum rate is maximized. Also, in the multi-cell uplink, users in adjacent cells may generate interference to the serving base-station, which necessitates a joint resource allocation scheme across multiple cells. Moreover, any resource allocation method should consider practical modulation and coding schemes (MCS) in order to be effective.

Here the term resource refers to sub carriers and the modulation and coding schemes (MCS). The resource allocation problems can be converted into maximum a-posteriori probability (MAP) problems over a graphical model. Low-complexity and effective message-passing based processes can be used in conjunction with greedy heuristics that yield near-optimal solutions. Several distributed methods can be used to extend the resource allocation algorithms to the multiple-cell scenario that provide system throughput improvements commensurate with the amount of inter-base station signaling involved.

The system can use several polynomial-time resource allocation processes, some of which are guaranteed to yield solutions that are within a constant fraction of the optimal solution and are also asymptotically optimal in the limit as the number of subcarriers in the system goes to infinity. Message-passing based resource allocation processes can be used solve the resource allocation problem over a multi-cell uplink in a distributed fashion. The processes also account for finite input alphabets and non-ideal practical outer codes.

The processes can be employed by the base-station in a cellular uplink to obtain a near-optimal performance. They have low-complexity, low memory-requirement and can be implemented in a distributed manner when used over a multi-cell uplink.

Figure 2:
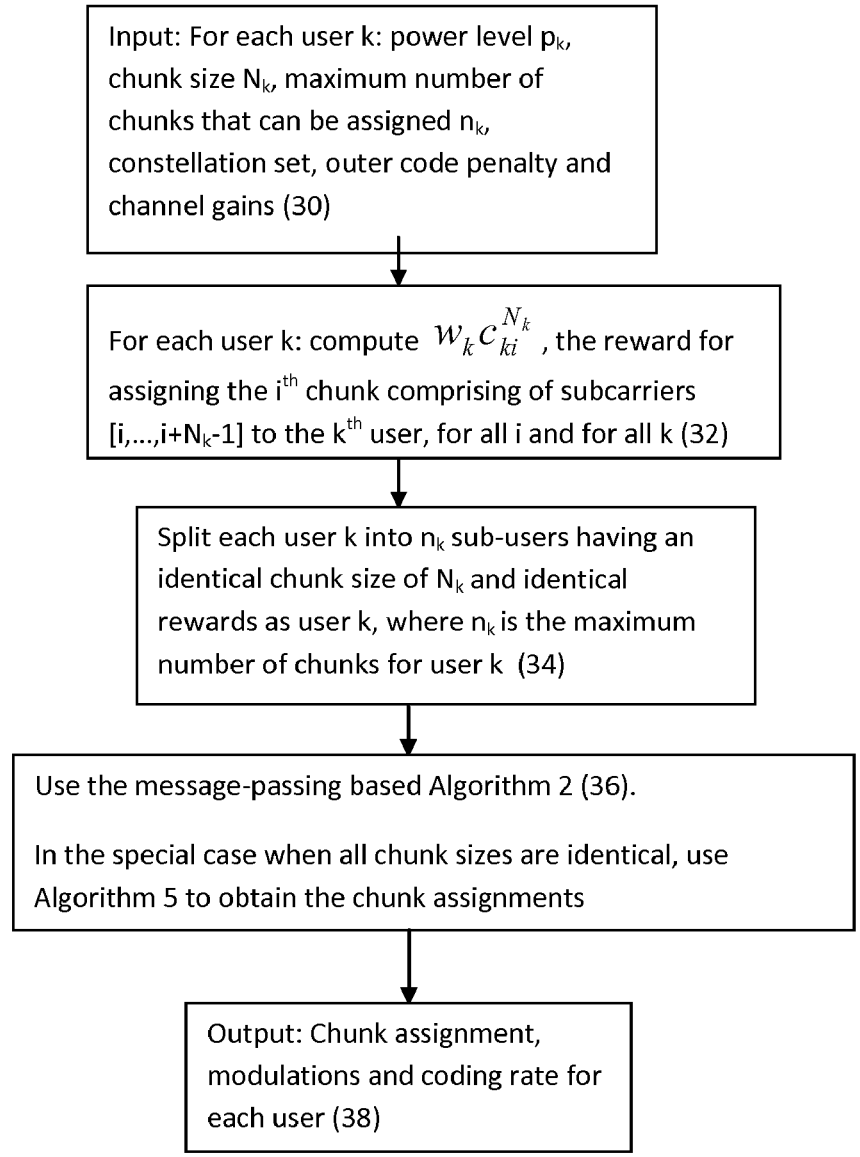
FIG. 2 shows an exemplary process to determine resource allocations in a wireless system.

FIG. 2 shows an exemplary process to determine resource allocations in a wireless system. First, the process receives as input for each user k: power level $p_k$, chunk size $N_k$, maximum number of chunks that can be assigned $n_k$, constellation set, outer code penalty and channel gains (30).

For each user k, the process determines $w_k c_{ki}^{N_k}$, the reward for assigning the $i^{th}$ chunk comprising of subcarriers [i, ..., i+$N_k$−1] to the $k^{th}$ user, for all i and for all k (32). Next, the process splits each user k into $n_k$ sub-users having an identical chunk size of $N_k$ and identical rewards as user k, where $n_k$ is the maximum number of chunks for user k (34). The process of FIG. 2 then uses the message-passing based Algorithm 2. In one special implementation when all chunk sizes are identical, the process uses Algorithm 5 to obtain the chunk assignments (36). The process of FIG. 2 then generates the output such as chunk assignment, modulations and coding rate for each user (38).

One embodiment handles the single-cell resource allocation problem given by $$\text{maximize} \sum_u w_u \sum_i c_{u,i}^{N_u} \alpha_{u,i}^{N_u} \text{ s.t.}$$

$$\sum_i \alpha_{u,i}^{N_u} \le n_u \forall u;$$

$$\sum_u \sum_{j=[i-N_u+1]^+}^{i} \alpha_{u,j}^{N_u} \le 1,$$

$$\forall i; \alpha_{u,i}^{N_u} \in \{0, 1\} \forall i, u.$$

where $[x]^+ = \max\{x,1\}$ and $\alpha_{u,i}^{N_u}=1$ if user u is assigned a chunk consisting of subcarriers [i, ..., i+$N_u$−1] and $w_u c_{u,i}^{N_u}$ is the corresponding reward.

The following embodiments provide resource allocation in a multi-cell uplink. The resource allocation problem in a multi-cell system is complex since a mobile user not only competes for resources with users in its own cell, but also generates interference for base-stations in adjacent cells. Users in a multi-cell system can be categorized into two groups: interior users and edge users. An interior user does not generate interference for the base-stations in adjacent cells; while an edge user can cause such interference. Various criteria can be used to divide users into different groups, for instance, the distance to the serving base station or the instantaneous channel conditions.

One embodiment uses the concept of "virtual" users to capture the interaction of users in different cells. The number of virtual users generated by an edge user depends on its location or channel condition. For example, if an edge user generates interference to only one neighboring cell, it spawns one virtual user. On the other hand, if an edge user is close to the junction of three adjacent cells, it may generate two virtual users. In this way the system can decompose a multi-cell chunk allocation problem into a collection of single-cell problems in which the interaction between users in neighboring cells is captured by constraints between edges users and their corresponding virtual users.

To simplify the multi-cell resource allocation, two assumptions are used: (1) the chunk sizes of all users are equal $N_T$. (2) the set of possible chunk allocations in each cell is restricted. In particular, each cell can allocate only base-chunks (BCs) where the $i^{th}$ BC spans subcarriers [(i−1)$N_T$+1, ..., i$N_T$].

The system solves the following optimization problem:

$$\max_{\beta_{k_b \ell}, \beta_{\bar{k}_{ib} \ell} \in \{0,1\}} \sum_b \sum_{k_b} w_{k_b} \left( \sum_\ell c_{k_b \ell} \beta_{k_b \ell} \right),$$

$$\text{s.t.} \sum_\ell \beta_{k_b \ell} \le n_{k_b},$$

$$\forall k_b, b;$$

$$\sum_{k_b} \beta_{k_b \ell} + \sum_{k_i \in A_b} \beta_{\bar{k}_{ib} \ell} \le 1,$$

$$\forall \ell, b; \beta_{\bar{k}_{ib} \ell} = \beta_{k_i \ell}, \forall k_i \in A_b, b, l.$$

$\beta_{k_b 1}=1$ if the $l^{th}$ BC is assigned to user k in cell b and is zero otherwise.

The first two sets of constraints contain the intra-cell orthogonality constraints for every single-cell. The constraints corresponding to inter-cell interference are captured in the third groups of constraints.

The system uses low-complexity distributed processes for resource allocation in DFT-S-OFDMA systems. The subcarrier allocation problem in a DFT-S-OFDMA uplink can be formulated as a set-packing problem, which in general is NP hard. Two algorithms can be used for a single-cell DFT-S-OFDMA uplink. The first process (Algorithm 2) is a message passing based heuristic, which in simulations was seen to perform very well. The second process (Algorithm 5) aims to solve a maximum weighted matching problem and is guaranteed to converge to a solution that is within half of the optimal one. The methods were then extended to solve the FC allocation problem over a multi-cell setup (Algorithms 6 and 7). In particular, a simple greedy method (Algorithm 6) involves only a small amount of information exchange among base-stations as well as a more sophisticated dual message-passing based method (Algorithm 7) which yields better performance but also demands more information exchange. The dual message-passing based process can be combined with the FFR technique in order to reduce the information exchange without significant performance degradation. As discussed in the incorporated by reference Provisional Patent Application Ser. No. 61/099,607, the performance of the processes has been evaluated through extensive simulations where they were shown to exhibit a near-optimal performance.

FIGS. 3-9 show exemplary processes for performing resource allocation. FIG. 3 shows an exemplary process for determining a solution to the following optimization problem $$\max_{v_j \in \{0,1\}, j=1, \ldots, P} \prod_j g_j(v_j) \prod_i f_i(h_i, v).$$

The max-product process starts by passing messages from variable nodes to factor nodes, and then new messages are calculated at every factor node and passed back to the variable nodes. This procedure is repeated until convergence or up to a given maximum number of iterations. The detailed procedure is given in Algorithm 1.

FIG. 3's message-passing max-product algorithm is then converted into a max-sum form and used in Algorithm 2 (FIG. 4) for FC allocation in a single cell DFT-S-OFDMA uplink. Due to the heuristic nature of the max-sum process, it may not converge to a feasible solution. Hence, a post-processing step (described in Algorithm 3) is carried out in Algorithm 2 to obtain a feasible solution from the tentative decision yielded by the message-passing method. The message-passing method can achieve an optimal solution if the corresponding factor graph is a tree, or it contains a single loop.

In FIG. 4, the single-cell resource allocation problem is recast as a MAP problem over a factor graph. Consequently, an efficient message-passing algorithm can be applied to the factor graph to solve it. The maximum number of FCs the kth user can be assigned is $n_k$. A group of $n_k$ sub-users for the kth user are defined such that the rate achieved by assigning every sub-user to an FC is equal to that of user k. The process converts the FC allocation problem into a standard form such that the maximization problem at step 2(b) of Algorithm 1 can be solved. The process can provide a near-optimal solution. Additionally, the process can be easily extended to tackle the more general FC allocation problem in which different users may have different chunk sizes. For example, because an edge user is typically at a larger distance from the base station, it needs to transmit with more power for successful data transmission. Consequently, an edge user may be allowed to use only one FC with a larger chunk size because its PAPR problem is more severe than that of an interior user.

Algorithm 3 (FIG. 5) generates a feasible solution from the tentative decisions obtained by the message-passing algorithm, while Algorithm 4 (FIG. 6) generates perturbed coefficients. The convergence and optimality of the message-passing algorithm is guaranteed for the bipartite maximum weighted matching problem only if it has a unique optimal solution. To resolve this issue, Algorithm 4 is used to perturb the coefficients, i.e., adding a small positive number $\Delta c_j$ to $\tilde{c}_j$ such that the resulting problem with perturbed coefficients has a unique optimal solution.

One embodiment implements a greedy algorithm for multi-cell resource allocation. This method described in Algorithm 6 (FIG. 8) is able to obtain a suboptimal solution in two steps and the messages are passed among adjacent cells only in the second step. Specifically, in the first step, the θ-perturbed Algorithm 5 (FIG. 7) is independently implemented to determine base chunk (BC) allocation in every cell. Base chunks are FCs where the first sub carrier of every assigned FC belongs to a given set, i.e., {sub carrier $(i-1)N_T+1:1 \leq i \leq M$}. The reward for allocating any BC in a cell to any of its virtual users is set to zero in this step, so no BC is allocated to any virtual users. In the second step every edge user occupies the same BCs as its corresponding virtual user(s), by trading BCs in a greedy fashion. The detailed algorithm is given in Algorithm 6 (FIG. 8).

Algorithms 6 (FIG. 8) and 7 (FIG. 9) are multi-cell resource allocation algorithms that can sub-optimally solve the multi-cell optimization problem. Algorithm 7 (FIG. 9) yields better performance but also requires more inter-BS signaling.

In FIG. 8, after step 1, corresponding to each BC we have an interference graph whose nodes are the users scheduled by each cell on that BS. An edge connects any two nodes if the corresponding users cannot be scheduled simultaneously and the BSs serving those users are said to be in conflict. Thus, the problem to be solved in step 2 is to obtain an independent set in this interference graph which maximizes the weighted sum-rate over that BC. The maximum weight independent set (MWIS) problem over a general graph is known to be hard to solve and approximate. A simple deterministic greedy technique is used which can be implemented in a distributed fashion with limited information exchange among BSs.

A BC allocation scheme based on a combination of Lagrange dual method and the message-passing process is presented next. This method can achieve a better performance than that of the greedy process at the expense of additional complexity. Also, it is possible to analyze its performance in terms of convergence and optimality. The problem can be decomposed into collections of subproblems. Each subproblem involves BC allocation in a single cell, which can be efficiently solved by Algorithm 5. The details are given in Algorithm 7 (FIG. 9). Due to the integer constraints, the strong duality property is not guaranteed for finite N, and the above processes may not converge to a feasible solution. However, the third step described in the greedy method can be used to recover a primal feasible solution at any step of the above process. Also, at each step of the above processes, due to the weak duality, the optimal objective function value is upper bounded by the objective function value of the dual problem; while it is lower bounded by the weighted sum rate of the obtained primary feasible solution. This provides a simple means to assess the performance of the proposed method after finite number of iterations. Although the solution obtained by the dual message-passing method is not guaranteed to achieve an optimal solution for finite N, this method can achieve a dual solution with zero duality gap in the limit as the number of sub carriers goes to infinity.

In one embodiment, a dual message-passing with fractional frequency reuse {FFR} can be used. At each iteration, the above dual message-passing process needs to pass a dual variable for every BC of each edge user, which gives rise to a large amount of information exchange between adjacent cells if the number of edge users is large. In practice, the amount of message-passing can be considerably reduced by combining the proposed dual message-passing The system restricts each edge user to be scheduled only on a subset of the available frequency band, based on its position in the cell. In an enhanced FFR scheme, the edge users are restricted to be scheduled on particular frequency sets as before. The key difference is that interior users can now be scheduled anywhere. The enhanced FFR scheme may result in degraded performance compared to the reuse-I scheme in Algorithm 7 but it can considerably reduce the amount of inter-BS signaling since the price (dual) variables need to be exchanged only for a subset of BCs.

FIG. 10 shows a greedy heuristic method for another single-cell resource allocation formulation (referred to as the LTE formulation). In this formulation, a total power budget $P_k$ is assigned to each user k and the total power $P_k$ of user k is evenly split among all subcarriers assigned to the user. Moreover, each user can be assigned only one contiguous set of RBs. There is no restriction on the chunk size. The RB allocation problem can then be formulated as $$\max \sum_k w_k \left( \sum_n \sum_i c_{k,i}^n \alpha_{k,i}^n \right)$$

$$\text{s.t.} \sum_n \sum_i \alpha_{k,i}^n \leq 1,$$

$$\forall k; \sum_q \sum_{j=[i-q+1]^+}^{i} \sum_k \alpha_{k,j}^q \leq 1,$$

$$\forall i; \alpha_{k,i}^n \in \{0, 1\}, \forall i, k, n,$$

where $[x]^+ = \max\{1, x\}$ and where $c_{k,i}^n$ is the maximum achievable rate under the available MCS and power budget when the $k^{th}$ user is allocated n contiguous RBs starting from the $i^{th}$ RB and $\alpha_{k,i}^n$ is an indicator variable such that $\alpha_{k,i}^n = 1$ if the $k^{th}$ user is allocated n contiguous RBs starting from the $i^{th}$ RB. The role of the first constraint is to guarantee that each user is allocated at-most one chunk of RBs. On the other hand, the second constraint ensures that each RB is covered by (or included in) at-most one chunk. A linear programming (LP) upper bound can be achieved by relaxing all binary constraints as $\alpha_{k,i}^n \in [0,1]$, $\forall$ k, i, n The solution obtained from the LP relaxation need not be feasible. However a good feasible solution can be extracted using a greedy method. Let $\{\hat{\alpha}_{k,i}^n\}$ be the LP solution. Next, define $\{\tilde{C}_{k,i}^n = c_{k,i}^n \hat{\alpha}_{k,i}^n\}$. Then using $\tilde{C}_{k,i}^n$ as the reward (rate) when user k is allocated n contiguous RBs starting from the $i^{th}$ RB along with the greedy method described below, a feasible allocation can be obtained.

A low-complexity greedy method is discussed next for RB allocation. An indicator function $X(\alpha_{k,i}^n, \alpha_{l,j}^m)$ is defined such that $X(\alpha_{k,i}^n, \alpha_{l,j}^m) = 1$ if the sets $\{i, i+1, \ldots, i+n-1\}$ and $\{j, j+1, \ldots, j+m-1\}$ overlap or if k=l and $X(\alpha_{k,i}^n, \alpha_{l,j}^m) = 0$ otherwise. Let S be a set containing any collection of the variables $\{\alpha_{k,i}^n\}$. We next define a metric $M(\alpha_{k,i}^n, S)$ which is the reward for setting $\alpha_{k,i}^n = 1$ given that $\alpha_{k,i}^n \in S$. In other words, $M(\alpha_{k,i}^n, S)$ is the reward for giving a chunk of n contiguous RBs to user k starting at the $i^{th}$ RB, among all possible allocations in S. The three possible choices for the metric, which are $$M(\alpha_{k,i}^n, S) = w_k c_{k,i}^n,$$

$$M(\alpha_{k,i}^n, S) = \frac{w_k c_{k,i}^n}{\sum_{\alpha_{l,j}^m \in S} X(\alpha_{k,i}^n, \alpha_{l,j}^m)},$$

$$M(\alpha_{k,i}^n, S) = \frac{w_k c_{k,i}^n}{\sum_{\alpha_{l,j}^m \in S} w_l c_{l,j}^m X(\alpha_{k,i}^n, \alpha_{l,j}^m)}.$$

The resource allocation can be performed using any one of the metrics defined above in the method described below.

The pseudo code for the Greedy Method for RB Allocation in LTE is as follows:

1. Initialization: Set S to be the set of all variables $\{\alpha_{k,i}^n\}$, $\forall$ k, n, i. Set G = $\phi$.
2. Repeat
3. Determine $\alpha_{\hat{k},\hat{i}}^{\hat{n}} = \text{argmax}_{\alpha_{k,i}^n \in S} M(\alpha_{k,i}^n, S)$.
4. Update G ← G ∪ $\{\alpha_{\hat{k},\hat{i}}^{\hat{n}}\}$
5. For all $\alpha_{k,i}^n \in S$
6. If $X(\alpha_{k,i}^n, \alpha_{\hat{k},\hat{i}}^{\hat{n}}) = 1$, then update S ← S − $\{\alpha_{k,i}^n\}$.
7. End For
8. Until S is empty.
9. Set all $\alpha_{\hat{k},\hat{i}}^{\hat{n}} = 1$, $\forall$ $\alpha_{\hat{k},\hat{i}}^{\hat{n}} \in G$ Next, another single-cell formulation (referred to as the LTE-Advanced formulation) is discussed. In this formulation, a total power budget $P_k$ is assigned to each user k and the total power $P_k$ of user k is evenly split among all subcarriers assigned to the user. However, each user can now be assigned multiple non-contiguous chunks, where each chunk again is a set of contiguous RBs. In particular, user k can be assigned upto $n_k$ non-contiguous chunks, where $n_k$ denotes the spectrum division factor for user k. However, there is no restriction on the size of any chunk. Let $c_{k,i}^{n,m}$ be the maximum achievable rate for user k, over a chunk of m contiguous RBs starting at RB i and when the total number of RBs given to user k is n. In order to obtain an integer programming formulation, a group of $n_k$ sub-users is generated for the $k^{th}$ user such that the rate achieved by assigning every sub-user to any chunk is equal to the rate achieved when that chunk is assigned to user k. In particular, $c_{k,s,i}^{n,m} = c_{k,i}^{n,m}$, $1 \leq s \leq n_k$, for all n, m, i. Next, a collection of new indicator variables $\{\alpha_{k,s,i}^{n,m}\}$ is defined such that $\alpha_{k,s,i}^{n,m} = 1$ if the $s^{th}$ sub-user of user k is given a chunk of m contiguous RBs starting at RB i and the total number of RBs given to all sub-users of user k is n. Also, let $\beta_n^k$ be a binary-valued variable such that $\beta_k^n = 1$ when the all the sub-users of user k are together given a total of n RBs and $\beta_k^n = 0$ otherwise.

The RB allocation problem can now be formulated as $$\max \sum_n \sum_m \sum_q \sum_k \sum_s w_k c_{k,s,q}^{n,m} \alpha_{k,s,q}^{n,m}$$

$$\text{s.t.} \sum_n \beta_k^n \leq 1, \forall k;$$

$$\sum_n \sum_m \sum_q \alpha_{k,s,q}^{n,m} \leq 1,$$

$$\forall 1 \leq s \leq n_k, k;$$

$$\sum_{s=1}^{n_k} \sum_m \sum_q m \alpha_{k,s,q}^{n,m} = n \beta_k^n; \forall n, k;$$

$$\sum_k \sum_s \sum_n \sum_m \sum_{q=[i-m+1]^+}^{i} \alpha_{k,s,q}^{n,m} \leq 1, \forall i;$$

$$\beta_k^n \in \{0, 1\}, \forall k, n; \alpha_{k,s,q}^{n,m} \in \{0, 1\},$$

$$\forall k, q, s, n, m.$$

The first three constraints ensure that each user k gets at-most $n_k$ non-contiguous chunks and the fourth constraint ensures that no two allocated chunks overlap. Again, an LP upper bound can be achieved by relaxing all binary constraints as $\beta_k^n \in [0,1]$, $\forall$ k, n and $\alpha_{k,s,q}^{n,m} \in [0,1]$, $\forall$ k, q, s, n, m.

Next, one implementation of a resource allocation method for LTE+ is discussed. In this implementation, available resource blocks (RBs) are numbered from [1, . . . , N]. A frequency chunk (FC) is any interval I in [1, . . . , N]. A division factor (DF) of user k is denoted $N_k$ and maximum transmit power is denoted $P_k$. Further, user k uses power $P_k/N_k$ for each FC and that the value of assigning an FC I to user k is B(k,I).

B(k,I) can be computed assuming power $P_k/N_k$ is equally divided among all subcarriers in I. Suppose that an input Q (where 1<=Q<=N) is specified where Q is the maximum number RBs in one chunk that can be assigned to a user. The pseudo-code is as follows:

```
Initialize: Let L be an empty set
    For m=1,...,Q (loop over interval or FC size)
        For j=1,....,N−m+1 (loop over starting point)
            Consider interval l=[j,j+m−1]
            Set Best_user=0;Best_value=0
            For k=1,...,K (loop over all users)
                Compute B(k,l)
                Check if user k is eligible for assignment to l
                If user k is eligible and B(k,l) > Best_value then
                    Best_value = B(k,l) and Best_user=k
            End (for k=1,...,k)
```

```
If Best_value>0 then
    Remove all FCs in L which overlap with l
    If the number of FCs in L assigned to Best_user is
        equal to its DF,
        then remove the FC in L assigned to Best_user having
        lowest value
    Add (l, Best_user, Best_value) to L
End (For j=1,...,N-m+1)
End (For m=1,...,Q)
For each user, boost power if number of FCs assigned to it in L
    is less than its DF
To Check if user k is eligible for assignment to l
    Compute C(k,l) which is the sum of values of all FCs in L which
        overlap with l
    If the number of FCs in L assigned to user k and not overlapping
        with l is equal to its DF then let Penalty be equal to the lowest
        value among all FCs in L assigned to user k. Else Penalty=0
    User k is eligible if:
        B(k,l) > a1*C(k,l) and
        B(k,l) > a2*Penalty
    Default choice is a1=2 and a2=2
```

Both the LTE and LTE+ formulations are in a set-packing problem form which allows the message passing method to be used to obtain solutions. Further, in both formulations an additional constraint can also be placed. Each user can now be assigned a set of n total RBs but where n can be expanded as $2^a 3^b 5^c$, where a; b; c are any non-negative integers. If J denotes the set of all such integers between 1 and N, then, in either formulation the system needs to only consider all n which belong to J.

The above system provides low-complexity distributed algorithms for resource allocation in DFT-SOFDMA systems. The system formulates the resource allocation problem in a DFT-S-OFDMA uplink as a set-packing problem, which in general is NP hard. One embodiment uses a message passing based heuristic over a single-cell DFT-S-OFDMA uplink, which performed well in simulations. A second embodiment solves a maximum weighted matching problem and is guaranteed to converge to a solution that is within half of the optimal one. The system can be extended to solve the FC allocation problem over a multi-cell setup. In particular, a simple greedy method can be used which involves only a small amount of information exchange among base-stations as well as a more sophisticated dual message-passing based algorithm which yields better performance but also demands more information exchange. The dual message-passing based algorithm was then combined with the FFR technique in order to reduce the information exchange without significant performance degradation.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A method to allocate resources in a single-cell discrete Fourier transform spread orthogonal frequency division multiple access (DFT-S-OFDMA) network, comprising:
   for each user, determining a reward for assigning each permissible frequency chunk (FC), where each FC is a set of contiguous subcarriers;
   splitting each user into one or more sub-users, each sub-user having identical rewards; and
   assigning resources using a greedy heuristic or a message-passing based procedure;
   wherein the reward for a $k^{th}$ user, is determined when assigning a chunk of subcarriers or resource blocks (RBs) starting from the $i^{th}$ subcarrier or RB [i, ..., i+n-1] of size n as $w_k c_{k,i}^n$, where $c_{k,i}^n$ is the maximum achievable rate under the available modulation and coding schemes (MCS) and power budget and $w_k$ is the weight or priority of user k.

2. The method of claim 1, comprising splitting each user k into $n_k$ sub-users each having identical rewards, where $n_k$ is a maximum number of chunks that can be assigned to user k.

3. The method of claim 2, wherein each of the sub-users have an identical chunk size of $N_k$.

4. The method of claim 1, comprising converting a resource allocation problem into a maximum a posteriori probability (MAP) problem over a graphical model.

5. The method of claim 1, comprising generating a solution from tentative decisions obtained by the message passing based FC allocation.

6. The method of claim 1, comprising generating perturbed coefficients so that a resulting problem has a unique optimal solution.

7. The method of claim 1, wherein all chunk sizes are identical, comprising applying a max-sum message passing based procedure solving a weighted matching problem to obtain the chunk assignments.

8. The method of claim 1, wherein the base station assigns chunks to different users such that no two assigned chunks overlap or intersect with each other.

9. The method of claim 1, comprising allocating resources by assigning a coding rate and one or more modulations to each user.

10. The method of claim 1, wherein the resource allocation comprises of chunk assignment and the assignment of coding rates and modulations to all users.

11. The method of claim 1, wherein the message passing comprises determining a max-product.

12. The method of claim 1 further comprising determining a max-product by
    passing messages from variable nodes to factor nodes,
    calculating a new message at every factor node and passing the new message back to the variable nodes.

13. The method of claim 12, comprising converting the max-product into a max-sum form.

14. The method of claim 1, comprising applying a statistic, which is the difference between the messages, as a single message in the message-passing.

15. The method of claim 1, comprising performing message passing with a greedy method for multi-cell base chunk allocation.

16. The method of claim 1, comprising using the Lagrange dual method in conjunction with message passing for multi-cell FC allocation.

17. A wireless system, comprising
   a. a base station; and
   b. a plurality of users communicating with the base station, each user being divided into one or more sub-users, each sub-user having identical rewards; and each user assigned resources through message-passing based frequency chunk allocation;
   wherein the base station determines the reward for a $k^{th}$ user when assigning a chunk of subcarriers or resource blocks (RBs) starting from the $i^{th}$ subcarrier or RB [i, ..., i+n-1] of size n as $w_k c_{ki}^n$.

18. The system of claim 17, comprising splitting each user k into $n_k$ sub-users each having identical rewards, where $n_k$ is a maximum number of chunks that can be assigned to user k.

19. The system of claim 18, wherein each of the sub-users have an identical chunk size of $N_k$.

20. The system of claim 17, comprising converting a resource allocation problem into a maximum a-posteriori probability (MAP) problem over a graphical model.

* * * * *